(12) United States Patent
Matsushita et al.

(10) Patent No.: US 8,167,601 B2
(45) Date of Patent: May 1, 2012

(54) BLOW MOLDING MACHINE WITH AIR CONDITIONING

(75) Inventors: Yousuke Matsushita, Yokohama (JP); Noboru Sawane, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 344 days.

(21) Appl. No.: 12/528,319

(22) PCT Filed: Feb. 18, 2008

(86) PCT No.: PCT/JP2008/052646
§ 371 (c)(1),
(2), (4) Date: Aug. 21, 2009

(87) PCT Pub. No.: WO2008/105253
PCT Pub. Date: Sep. 4, 2008

(65) Prior Publication Data
US 2010/0015269 A1    Jan. 21, 2010

(30) Foreign Application Priority Data

Feb. 26, 2007    (JP) ................................ 2007-045813
Feb. 26, 2007    (JP) ................................ 2007-045814

(51) Int. Cl.
*B29C 49/42*    (2006.01)
*B29C 49/68*    (2006.01)
(52) U.S. Cl. ............ 425/73; 425/210; 425/526; 425/534
(58) Field of Classification Search .................... 425/73, 425/174.4, 210, 526, 534
See application file for complete search history.

(56) References Cited

U.S. PATENT DOCUMENTS

| 4,880,581 A | * | 11/1989 | Dastoli et al. ................... 264/39 |
| 5,322,651 A | | 6/1994 | Emmer |
| 5,714,109 A | | 2/1998 | Diller |
| 5,718,853 A | | 2/1998 | Ingram |
| 2007/0085243 A1 | * | 4/2007 | Doudement ................... 264/521 |

FOREIGN PATENT DOCUMENTS

| JP | 2000-202895 A | 7/2000 |
| JP | 2004-306512 A | 11/2004 |
| JP | 2006-52873 A | 2/2006 |
| JP | 2006-287158 A | 10/2006 |
| JP | 2008-68494 A | 3/2008 |

OTHER PUBLICATIONS

International Preliminary Report on Patentability for the Application No. PCT/JP2008/052646 mailed Sep. 11, 2009. Supplementary European Search Report for the Application No. EP 08 71 1470 dated Oct. 6, 2010.
International Search Report for the Application No. PCT/JP2008/052646 mailed May 13, 2008.

* cited by examiner

*Primary Examiner* — Robert B Davis
(74) *Attorney, Agent, or Firm* — Cheng Law Group, PLLC

(57) ABSTRACT

A blow molding machine with air conditioning that while minimizing the introduction rate of outside air maintains constant temperature in a plant building and the interior of a blow molding machine and production of a bottle as a final configuration with stability in its measurement value. The machine is constructed so that air for biaxially stretching blow molding together with hot air of heating zone and internal air of a plant building is suctioned by suction chamber, filtered by primary filter and secondary filter into clean air, brought into heat exchange with primary cooling coil, fed under pressure by air blower and released through low-temperature duct into the interior of the plant building. Further, a housing on its side face is provided with vent to allow reflux of the clean air released into the interior of the plant building and flow into the heating zone and blow zone.

12 Claims, 5 Drawing Sheets

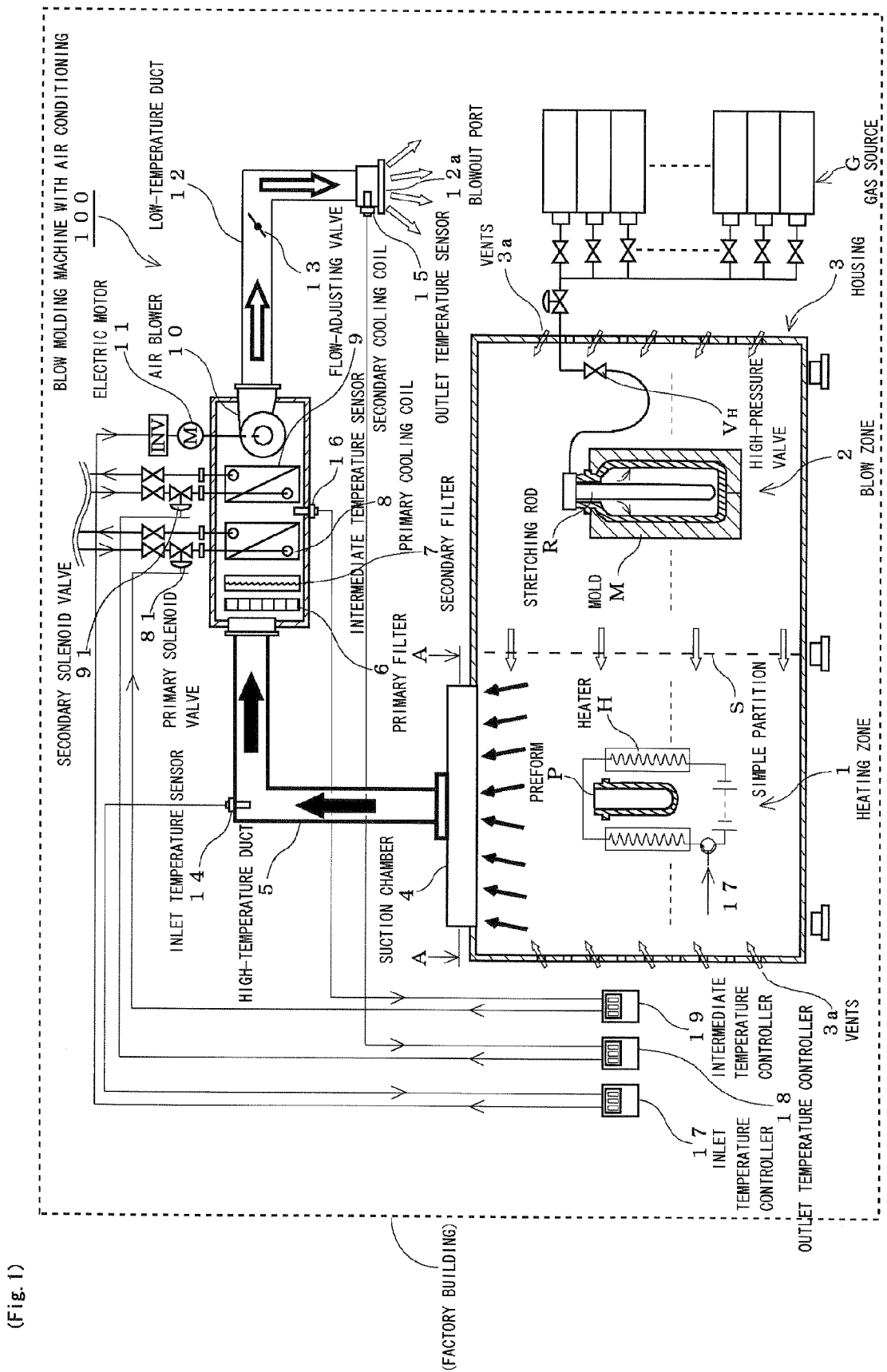
(Fig. 1)

(Fig. 2)
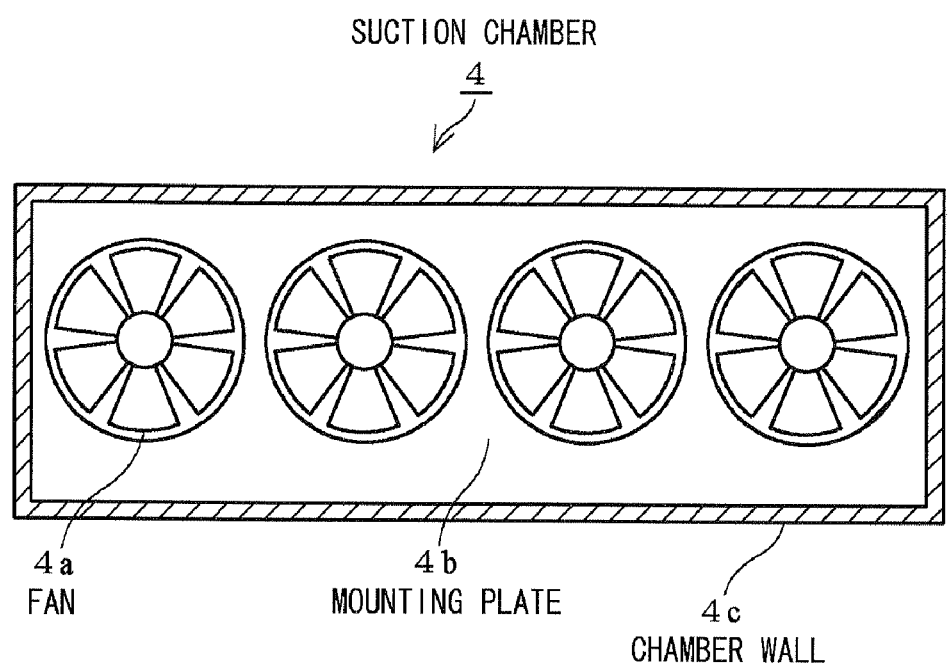

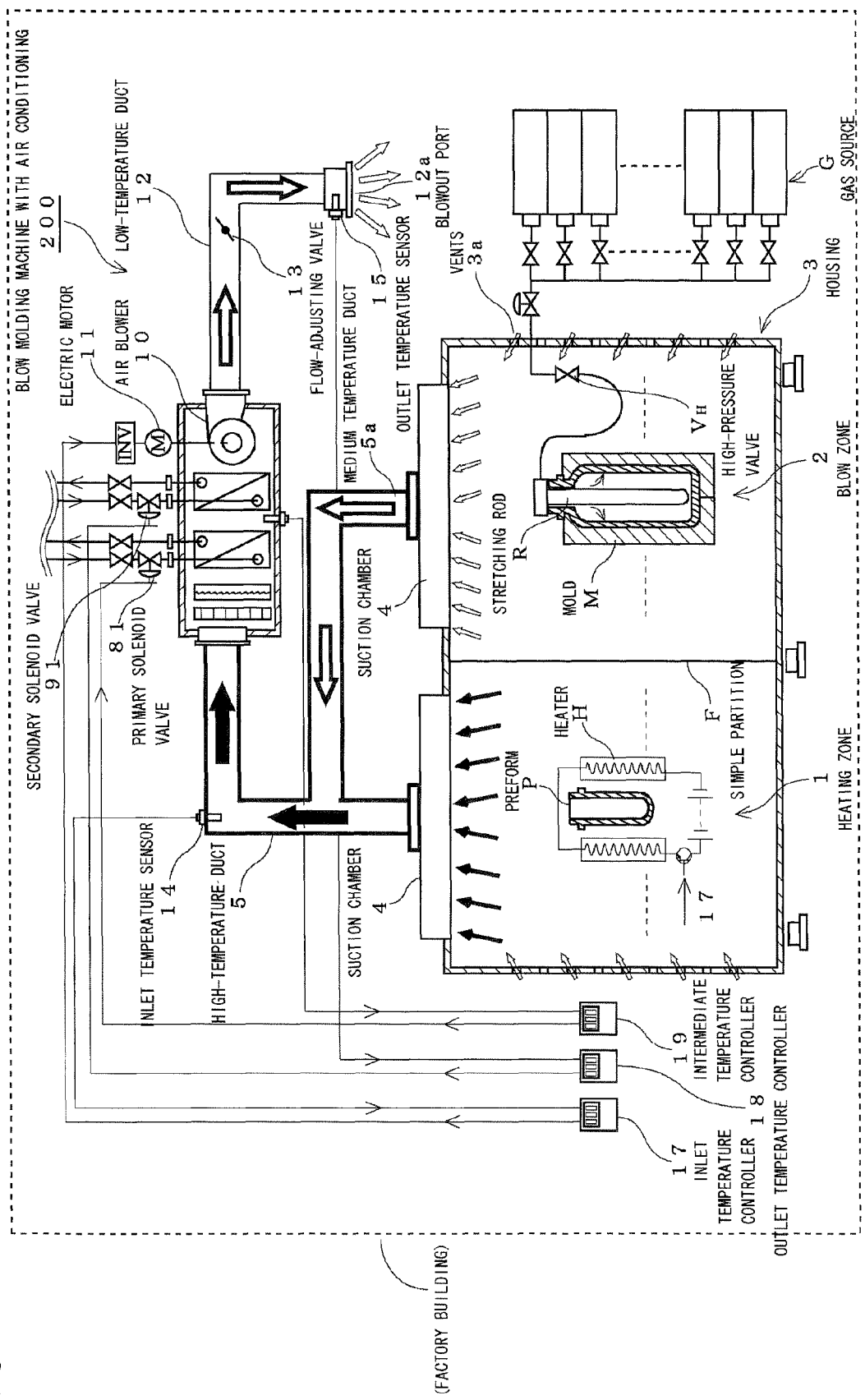
(Fig. 3)

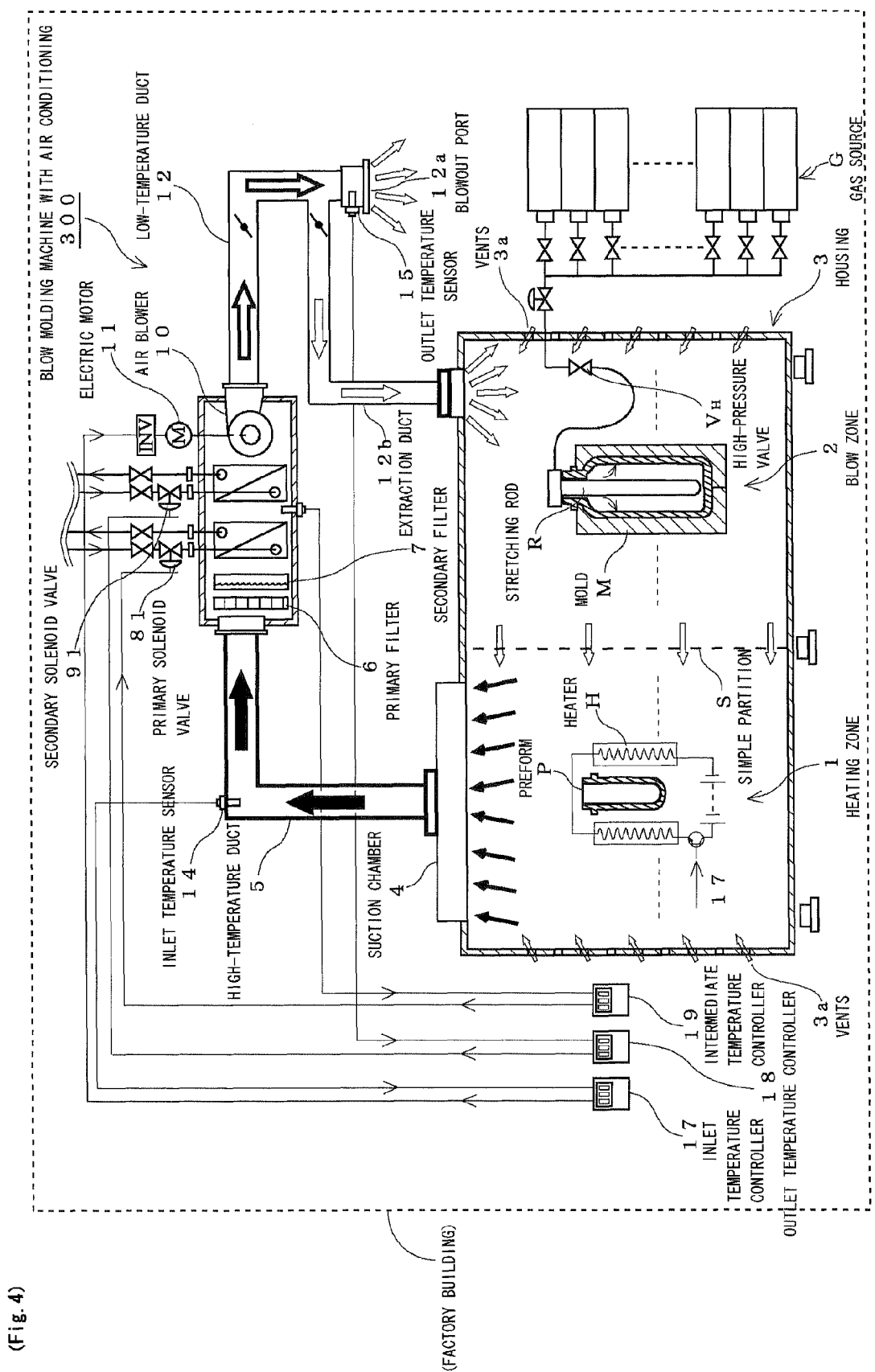
(Fig. 4)

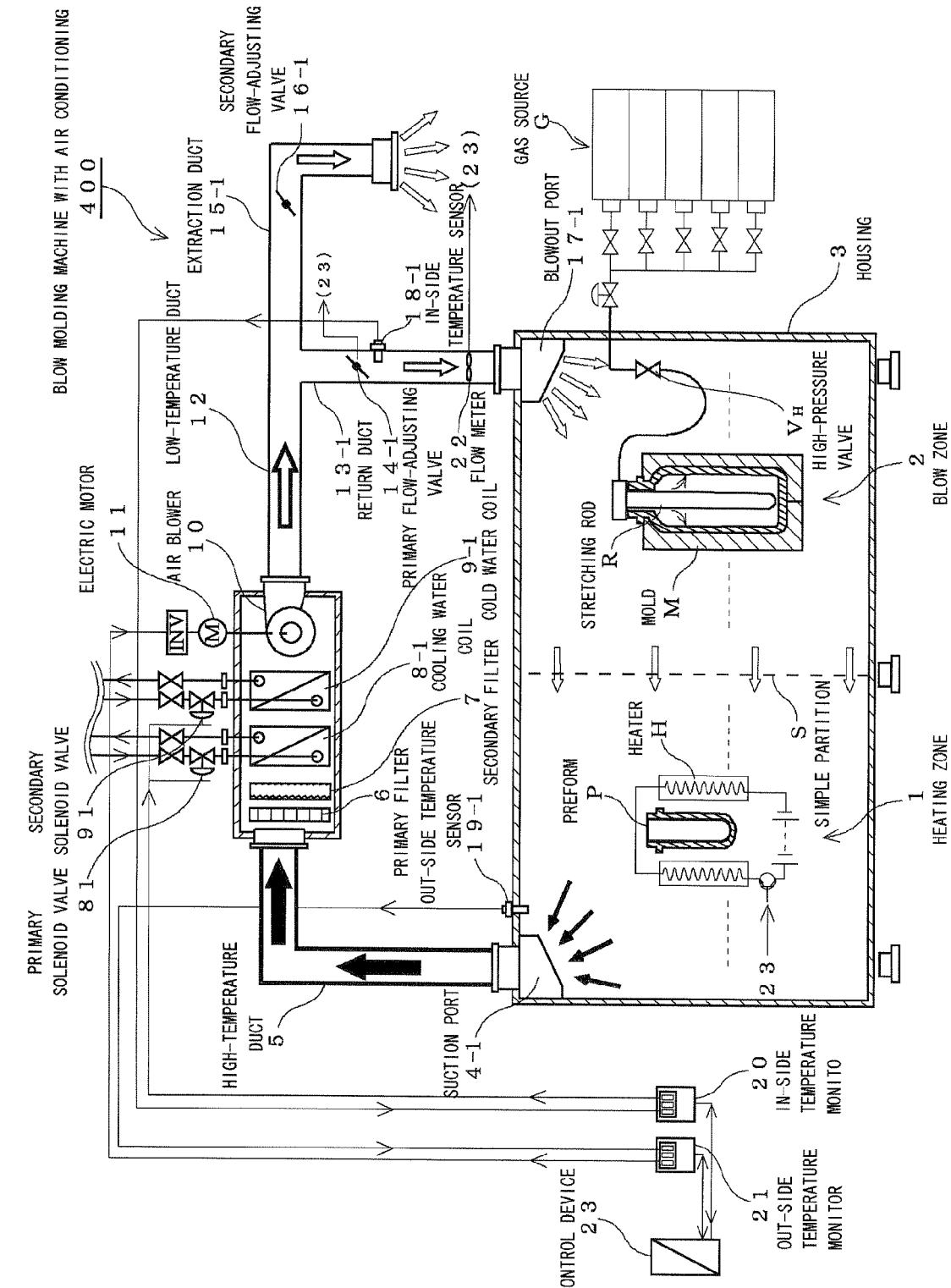
(Fig. 5)

BLOW MOLDING MACHINE WITH AIR CONDITIONING

TECHNICAL FIELD

The present invention relates to a blow molding machine with air conditioning, and more particularly to a blow molding machine with air conditioning for biaxial stretch blow molding of bottles from preforms, in which the temperature in a factory building and the temperature in a blow molding machine are kept constant while keeping the introduction of outside air to a minimum, and in which bottles as the final shapes can be produced with stable measured values.

BACKGROUND ART

In food processing plants, food packaging manufacturing plants and the like, the interior of the factory building is kept at positive pressure by setting air pressure in the factory building to be higher than external pressure, with a view to preventing contamination of the factory building by outside germs. When introducing outside air (air outside the factory building) into the factory building, therefore, the air is introduced after being filtered to remove as many germs and the like as possible (see for instance, Patent document 1).

Meantime, large amounts of PET bottles for a beverage container have been produced in recent years, on account of such advantages as their lightweight and easy handling.

These PET bottles are obtained by blow molding, which involves manufacturing first a primary molding called a perform by injection molding, followed by heating of the preform at a temperature that enables orientational drawing of the preform. The molding equipment for PET bottles used during blow molding is roughly split between a heating zone where the preforms are heated, and a blow molding zone where the heated preforms are blow-molded. The interior of the heating zone is heated up to a predetermined temperature, whereupon the preforms are introduced into the zone and are heated up to a temperature that allows orientational drawing. In case of fluctuations in the temperature in the factory building where the blow molding equipment is installed, which causes the atmosphere temperature in the blowing equipment to fluctuate as well, there may occur changes in the measured values of bottles, which are the final shapes, even if the temperature of the preforms and the temperature of the blow molding mold stand at a set temperature. The temperature of outside air varies substantially depending on the season. Therefore, when filtered outside air is to be introduced into the factory building, various schemes are adopted so as to keep the interior of the factory building at a constant temperature, for instance by installing air conditioning equipment in the factory building.

Herein, when a large amount of air from inside the factory building is to be discharged outside and a large amount of outside air is introduced into factory building in its stead, it becomes necessary to install large air conditioning equipment and filters having a large filtering surface area at multiple sites in order to quickly adjust the temperature in the factory building to a predetermined temperature. The associated extra cost undermines the economic logic of this approach. An easily conceivable alternative involves discharging out air from inside the factory building by small amounts, and introducing in its stead outside air into the factory building, by small amounts. However, doing so necessitates filtering and air conditioning equipment, and so this approach is no different from the above-described one.

To keep the interior of the heating zone at a predetermined temperature, the air heated in the heating zone is discharged into the factory building lying outside the zone. Discharging heater air into the factory building, however, causes the temperature in the factory building to rise, which deteriorates the working environment. The temperature could be kept constant by introducing outside air, but doing so would entail arranging filtering equipment (filters) and air conditioning equipment at multiple sites, as is the case above.

Known equipment used in the biaxial stretch blow molding includes, for instance, an air conditioner for injection stretch blow molding machines in which an injection molding station where preforms are molded is isolated, by way of an isolating sheet, from a blow molding station where preforms are stretch-blown, in order to prevent that dew condensation arises on the injection mold and affects the preform molding, and in which air having had the dryness thereof increased is blown again into the injection molding station, to prevent dew condensation on the injection mold (for instance, Patent document 2).

When the temperature of the outside air fluctuates, the temperature of the blow molding machine installed in the building fluctuates likewise, as a result of which there varies the atmosphere temperature in the blow molding machine, and there may vary also the measurement values of bottles, which are the final shapes, even if the temperature of the preforms and the temperature of the mold for blow molding are at a set temperature. It becomes thus difficult to produce bottles stably.

Patent document 1: Japanese Patent Application Laid-open No. 2006-52873

Patent document 2: Japanese Patent Application Laid-open No. 2000-202895

DISCLOSURE OF THE INVENTION

Problems to be Solved by the Invention

Thus, introducing outside air to keep constant the temperature in the factory building is problematic on account of the costs incurred in the necessary air conditioning equipment and filters having a large filtering area.

In the above-described air conditioner for injection stretch blow molding machines, dehumidification is carried out only in the injection molding station, while the blow molding station, where stretch is carried out, is not air-conditioned. Therefore, the measured values of bottles, as the final shapes, vary still on account of the temperature fluctuations of the outside air, which is problematic.

In the light of the above problems of conventional art, it is an object of the present invention to provide a blow molding machine with air conditioning, for biaxial stretch blow molding of bottles from preforms, that allows keeping constant the temperature in a factory building and the temperature inside a blow molding machine while keeping to a minimum the introduction of outside air, and in which bottles as the final shapes can be produced with stable measured values.

Means for Solving the Problems

In order to attain the above object, the blow molding machine with air conditioning according to claim 1 is a blow molding machine with air conditioning, comprising a heating zone where a preform is heated, a blow zone where the preform is biaxially stretch-blown, and suction means which is provided in at least the heating zone and discharges out heated air from the interior of the heating zone, wherein air in the heating zone is suctioned by the suction means and filtered into clean air, the temperature of the air is adjusted to a constant temperature/temperature range, whereupon the air is discharged into a factory building in which the blow molding machine is installed, and is recirculated to the heating zone and the blow zone, to thereby keep constant respective atmosphere temperatures in the factory building and the zones.

In the above blow molding machine with air conditioning, the filtered/cooled clean air discharged into the factory building spreads within the factory building, and recirculates then into the heating zone and the blow zone. As a result, not only the temperature in the factory building but also the atmosphere temperatures in the heating zone and the blow zone can be kept constant through repeated circulation (recirculation) of this clean air. It is also possible to keep constant the temperature in the factory building, while keeping introduction of outside air to a minimum, through repeated circulation of clean air that involves causing high-pressure air, containing a substantial amount of oxygen and used during biaxial stretch blow molding of preforms, to be appropriately suctioned (captured), by way of the suction means, alongside air in the factory building and air in the heating zone, the air being then filtered, cooled, and discharged into the factory building. In this way, clean air circulation appropriately contributes also to maintaining a positive pressure in the factory building.

The blow molding machine with air conditioning according to claim 2 has formed therein an air inlet section through which the air is introduced into the heating zone and/or the blow zone.

In the blow molding machine with air conditioning having the above configuration, filtered/cooled clean air can spread within the factory building and can appropriately recirculate thereafter into the heating zone and the blow zone. This contributes to stabilizing the atmosphere temperatures in the heating zone and the blow zone.

In the blow molding machine with air conditioning according to claim 3, the suction means is a fan, and the fan is surrounded by a chamber having a space inside.

In the blow molding machine with air conditioning having the above configuration, the heated air of the heating zone is captured efficiently, without leaking outside. As a result, this allows preventing the work environment in the factory building from deteriorating on account of rising temperature. The fan adjusts the flow of air in the blow molding machine from the blow zone to the heating zone. Therefore, the fan allows appropriately capturing the air used for biaxial stretch blow molding of the preforms.

The blow molding machine with air conditioning according to claim 4 comprises a return pipe that extracts part of the air discharged into the factory building and recirculates the extracted air to the heating zone and/or blow zone, wherein the recirculated air flows continuously in the direction from the blow zone to the heating zone after the temperature and the flow rate thereof are adjusted to a constant temperature/temperature range and a constant flow rate/flow rate range, respectively.

In the above blow molding machine with air conditioning, some or all of the clean air suctioned from the heating zone and being filtered has the temperature and flow rate thereof adjusted to a constant temperature and a constant flow rate, thereafter it is supplied again to the blow zone, flowing continuously from the blow zone to the heating zone. The atmosphere temperatures of the blow zone and the heating zone are kept constant thereby. Unlike in indirect cooling such as water cooling or the like, the air adjusted to a constant temperature and a constant flow rate directly robs heat from a target object through direct contact therewith, and hence cooling efficiency is very high. In addition, the atmosphere temperatures of the heating zone and the blow zone can be stabilized and kept constant, while keeping to a minimum the influence of heat transfer through convection, by adjusting the flow of air from the blow zone to the heating zone. The air suctioned from the heating zone is made into filtered clean air, and can therefore be discharged as-is into the building where the equipment is installed. Therefore, when positive pressure is to be maintained inside the building, discharging part of that air into the building allows doing so while conditioning at the same time the air in the building. This has the effect of stabilizing the measured values of final-shape bottles while reducing the total running costs incurred in controlling the temperature of the blow zone and the heating zone and in maintaining the positive pressure in the building. The interior of the molding machine can also be kept appropriately clean through continuous flow of clean air from the blow zone to the heating zone.

In the blow molding machine with air conditioning according to claim 5, air suctioned from the heating zone opposes a first cooling means having a flow rate adjustment capability, and exchanges heat with the first cooling means while being pressure-fed by an air-blowing means.

When high-temperature air suctioned from the heating zone exchanges heat with the first cooling means in the blow molding machine with air conditioning having the above configuration, the heat transfer amount that is exchanged can be manipulated by operating the first cooling means and/or the air-blowing means. Air temperature can be controlled as a result with good precision.

In the blow molding machine with air conditioning according to claim 6, the first cooling means exchanges heat with a second cooling means provided separately and having a flow rate adjustment capability.

In the blow molding machine with air conditioning having the above configuration, the heat robbed from the high-temperature air by the first cooling means is appropriately recovered by the second cooling means, which allows appropriately limiting rises in temperature in the first cooling means. Air temperature can be controlled as a result with good precision through appropriate heat exchange between high-temperature air and the first cooling means.

In the blow molding machine with air conditioning according to claim 7, the temperature of air being recirculated to the blow zone is controlled by a control means that operates the first cooling means and the second cooling means or the air-blowing means, or a combination of these, on the basis of a feedback signal from a temperature sensor.

In the blow molding machine with air conditioning having the above configuration air temperature is controlled with good precision.

Effect of the Invention

In the blow molding machine with air conditioning of the present invention, filtered/cooled clean air spreads within the factory building and is then recirculated to the heating zone and the blow zone. Therefore, not only the temperature in the factory building but also the atmosphere temperatures in the heating zone and the blow zone can be kept constant through repeated circulation of this clean air. The high-pressure air used during biaxial stretch blow molding of the preforms comprises a substantial amount of oxygen. Therefore, it is also possible to keep constant the temperature in the factory building, as well as the atmosphere temperatures in the heating zone and the blow zone, while keeping introduction of outside air to a minimum, by appropriately suctioning the high-pressure air by way of suction means such as a fan, filtering/cooling the high-pressure air, alongside the heated air of the heating zone and the recirculated clean air, and re-discharging the air into the factory building. The heated air of the heating zone is appropriately captured by suction means such as a fan. As a result, this allows preventing the work environment in the factory building from deteriorating on account of rising temperature.

In the blow molding machine with air conditioning of the present invention, the atmosphere temperatures in the blow zone and the heating zone can be kept constant by returning again, to the blow zone, some or all the clean air suctioned from the heating zone, filtered and adjusted to constant temperature and constant flow rate, in a continuous flow of clean air from the blow zone to the heating zone. As a result, bottles can be produced stably, with stable measured values of the final-shape bottles, even if the outside air temperature (temperature in the building) fluctuates. The air returned to the blow zone becomes high-temperature air by passing through the heating zone, is suctioned by a suction port, exchanges heat with the first cooling means and is further pressure-fed by the air-blowing means, becoming low-temperature air that is re-used. On the other hand, the remaining low-temperature air not being reused is discharged into the building. This allows managing both temperature and pressure in the building in which the blow molding machine is installed, and has the effect of lowering as a result the total running costs incurred in, for instance, temperature control in the building and temperature control in the blow zone and the heating zone. The air flowing out of the blowout port of the blow zone is filtered clean air that is continuously supplied from the blow zone to the heating zone. This allows as a result keeping both of the blow zone and the heating zone in appropriate clean condition.

The temperature of the air being returned to the blow zone is adjusted with high precision since it is adjusted through operation of the first cooling means and the second cooling means, or through operation of the air-blowing means, or by a suitable combination of these.

BRIEF DESCRIPTION OF THE DRAWINGS

FIG. 1 is a schematic explanatory diagram illustrating a blow molding machine with air conditioning of the present invention;

FIG. 2 is an explanatory diagram illustrating the cross section A-A of FIG. 1;

FIG. 3 is a schematic explanatory diagram illustrating another example of the blow molding machine with air conditioning of the present invention;

FIG. 4 is a schematic explanatory diagram illustrating another example of the blow molding machine with air conditioning of the present invention; and FIG. 5 is a schematic explanatory diagram illustrating another example of the blow molding machine with air conditioning of the present invention;

EXPLANATION OF REFERENCE NUMERALS 1 heating zone
2 blow zone
3 housing
4 suction chamber
5 high-temperature duct
6 primary filter
7 secondary filter
8 primary cooling coil
9 secondary cooling coil
10 air blower
11 electric motor
12 low-temperature duct
13 flow-adjusting valve
14 inlet temperature sensor
15 outlet temperature sensor
16 intermediate temperature sensor
17 inlet temperature controller
18 outlet temperature controller
19 intermediate temperature controller
4-1 suction port
8-1 cooling water coil
9-1 cold water coil
13-1 return duct
14-1 primary flow-adjusting valve
15-1 extraction duct
16-1 secondary flow-adjusting valve
17-1 blowout port
18-1 in-side temperature sensor
19-1 out-side temperature sensor
20 in-side temperature monitor
21 out-side temperature monitor
22 flow meter
23 control device
100, 200, 300, 400 blow molding machine with air conditioning

BEST MODE FOR CARRYING OUT THE INVENTION

The present invention will be explained in more detail with reference to the following embodiments illustrated in the figures.

FIG. 1 is a schematic explanatory diagram illustrating a blow molding machine with air conditioning 100 of the present invention.

The blow molding machine with air conditioning 100 comprises a heating zone 1 where a preform P is pre-heated by a heater H; a blow zone 2 where the pre-heated preform P is set in a mold M and biaxial stretch blow molding is carried out using a stretching rod R and high-pressure air; a housing 3 covering the above zones; a suction chamber 4 that suctions heated air from the heating zone 1; a high-temperature duct 5 through which there flows the heated air suctioned by the suction chamber 4; a coarse primary filter 6 that filters the heated air; a fine secondary filter 7 that filters the heated air; a primary cooling coil 8, as first cooling means, through which there flows cooling water that robs heat from the heated air; a primary solenoid valve 81 that adjusts the flow rate of the cooling water; a secondary cooling coil 9, as second cooling means, through which there flows cold water for recovering the heat robbed from the heated air by the cooling water; a secondary solenoid valve 91 that adjusts the flow rate of the cold water; an air blower 10, as air-blowing means, that feeds low-temperature air downstream; an electric motor 11 that drives the air blower; a low-temperature duct 12 through which the low-temperature air flows; a flow-adjusting valve 13 that adjusts the flow rate of low-temperature air being discharged into a factory building; an inlet temperature sensor 14 that measures the temperature of the heated air flowing through the high-temperature duct 5; an outlet temperature sensor 15 that measures the temperature of the low-temperature air that flows through the low-temperature duct 12; an intermediate temperature sensor 16 that measures the temperature of air immediately after being cooled by the primary cooling coil 8; an inlet temperature controller 17 that receives a measurement signal from the inlet temperature sensor 14 and, on the basis of a deviation between the measured temperature and a set temperature, performs control by operating the revolutions of the electric motor 11 so that the temperature in the high-temperature duct 5 reaches the set temperature; an outlet temperature controller 18 that receives a measurement signal from the outlet temperature sensor 15 and, on the basis of a deviation between the measured temperature and a set temperature, performs control by operating the secondary solenoid valve 91 so that the temperature in the low-temperature duct 12 reaches the set temperature; and an intermediate temperature controller 19 that receives a measurement signal from the intermediate temperature sensor 16 and, on the basis of a deviation between the measured temperature and a set temperature, performs control by driving the primary solenoid valve 81 so that the temperature of air after having passed through the primary cooling coil reaches the set temperature. For convenience of drawing, the secondary cooling coil 9 is depicted in the drawing as opposing the heated air and arranged side-by-side with the primary cooling coil 8. In actuality, however, the secondary cooling coil 9 is arranged so as to exchange heat with the primary cooling coil 8, without opposing the heated air.

FIG. 2 is an explanatory diagram illustrating the cross section A-A of FIG. 1.

The suction chamber 4 comprises fans 4a that suck heated air from the heating zone 1; a mounting plate 4b that fixes the fans; and a chamber wall 4c that covers the whole. Although not shown in the figure, a buffer zone (space) connected to the high-temperature duct 5 is formed at the downstream portion of the fans 4a. In the present embodiment the fans are in the form of a four-fan module. The number or fans, however, is not limited thereto, and may vary depending on, for instance, the size of the heating zone 1 or of the blow zone 2.

The heating zone 1 and the blow zone 2 are partitioned by a simple partition S that allows inflow and outflow of a gas. The suction chamber 4 causes the flow of air to be directed from the blow zone 2 towards the heating zone 1. As described below, the air flowing out of a blowout port 12a of the low-temperature duct 12 is clean air whose temperature and flow rate are kept constant. The temperature in the factory building can be kept constant through continuous circulation of this air. The side walls of the housing 3 are provided with multiple vents 3a, as air inlet sections, through which air can flow in and out. Clean air discharged into the factory building is recirculated through the vents 3a to flow into the various zones. When the temperature is kept constant within the factory building, therefore, the atmosphere temperatures in the heating zone 1 and the blow zone 2 are kept likewise constant. As a result, it becomes unnecessary to introduce and filter a large amount of outside air and to install air conditioning equipment having high processing power in order to keep constant the temperature in the factory building, as is the case when a conventional blow molding machine is installed in a building. The clean air blown out of the blowout port 12a is discharged into the factory building, and is then recirculated to the heating zone 1 and the blow zone 2 via the vents 3a. The temperature in the factory building and the temperature in the heating zone 1 and the blow zone 2 can be kept constant through repeated circulation including filtering, cooling and re-discharge.

The oxygen concentration of the air in the factory building can be expected to drop gradually as the clean air continues to be recirculated in the factory building. In the blow molding machine with air conditioning 100, however, high-pressure air is jetted along the side faces of the stretching rod R during biaxial stretch blow molding of the preforms. This air is appropriately captured by the suction chamber 4, is filtered and is cooled, to be discharged again into the factory building, and thus the oxygen concentration in the air does not drop readily. In consequence, the oxygen concentration drops gradually when the blow zone 2 is not in operation, and hence outside air must be introduced and filtered in such cases. When the blow zone 2 is in operation, however, high-pressure air is jetted along the side faces of stretching rod R, and hence it is no longer necessary to introduce large amounts of outside air and to adjust the temperature thereof.

Thus, the temperature in the factory building, and consequently the atmosphere temperatures in the heating zone 1 and the blow zone 2 are not affected by fluctuations in the outside air temperature. This makes unlikelier, as a result, the occurrence of problems such as variation in the measured values of the final-shape bottles.

The clean air, filtered and having had the temperature and flow rate thereof adjusted, can also contribute to maintaining the positive pressure in the factory building by being discharged into the factory building via the low-temperature duct 12.

The air discharged into the factory building via the blowout port 12a of the low-temperature duct 12 is kept for instance at a temperature of 20° C. immediately before the blowout port 12a. As the air spreads within the factory building, circulating into the heating zone 1, or circulating into the blow zone 2 and being suctioned thence into the heating zone 1, the air receives heat from the heater H or the like, so that the temperature of the air rises up to, for instance, 50 to 55° C. in the vicinity of the suction chamber 4. The temperature-raised heated air passes through the high-temperature duct 5, through the primary filter 6 and the secondary filter 7, is cleaned to a predetermined cleanliness level, is cooled as described below, and is discharged again into the factory building.

The air used during biaxial stretch blow molding of the preform P is suctioned by the suction chamber 4 together with the recirculation air in the factory building and the heated air in the heating zone 1, passes then through the high-temperature duct 5, is cleaned to a predetermined cleanliness by the primary filter 6 and the secondary filter 7, and comes into contact with the subsequent primary cooling coil 8, whereupon the air gives up its heat to cooling water in the primary cooling coil 8 while being cooled by the primary cooling coil 8. The air is further pressure-fed by the air blower 10, and the temperature thereof drops to about 20° C. The resulting low-temperature air flows through the low-temperature duct 12. The low-temperature air flowing through the low-temperature duct 12 is discharged into the factory building via the blowout port 12a. The temperature of the air discharged via the blowout port 12a is detected by the outlet temperature sensor 15. A corresponding measurement signal is sent to the outlet temperature controller 18. Upon receiving the measurement signal, the outlet temperature controller 18 checks the deviation between the measured temperature and a set temperature. When there is a deviation, the outlet temperature controller 18 performs control by driving the secondary solenoid valve 91 to control the flow rate of cold water flowing through the secondary cooling coil 9, so as to bring the temperature of the air in the blowout port 12a close to the set temperature. Similarly, the temperature of the air cooled by the primary cooling coil 8 is detected by the intermediate temperature sensor 16. A corresponding measurement signal is sent to the intermediate temperature controller 19. Upon receiving the measurement signal, the intermediate temperature controller 19 checks the deviation between the measured temperature and a set temperature. When there is a deviation, the intermediate temperature controller 19 performs control by driving the primary solenoid valve 81 to control the flow rate of cooling water flowing through the primary cooling coil 8, so as to bring the temperature of air immediately after having passed through the primary cooling coil 8 close to the set temperature. The temperature of the air flowing through the high-temperature duct 5 is detected by the inlet temperature sensor 14. A corresponding measurement signal is sent to the inlet temperature controller 17. Upon receiving the measurement signal, the inlet temperature controller 17 checks the deviation between the measured temperature and a set temperature. When there is a deviation, the inlet temperature controller 17 controls the driving of an inverter INV of the electric motor 11 to control the suction volume of the air blower 10 so as to bring the temperature of air passing through the high-temperature duct 5 close to the set temperature.

The flow rate of low-temperature air discharged into the factory building is adjusted by adjusting the degree of opening of the flow-adjusting valve 13. The degree of opening may be adjusted manually or automatically.

The inlet temperature sensor 14 measures the atmosphere temperature in the heating zone 1. A corresponding measurement signal is sent to the inlet temperature controller 17. Upon receiving the measurement signal, the inlet temperature controller 17 checks the deviation between the measured temperature and a set temperature. When there is a deviation, the atmosphere temperature in the heating zone 1 is adjusted by increasing or decreasing the current flowing through the heater H.

In the present embodiment, the secondary cooling coil 9 does not stand opposite the heated air, but exchanges heat with the primary cooling coil 8. The present embodiment, however, is not limited thereto, and the secondary cooling coil 9 may stand opposite the heated air and exchange heat therewith. In this case, the heat of the heated air can be appropriately recovered by both the primary cooling coil 8 and the secondary cooling coil 9.

In the blow molding machine with air conditioning 100, a large amount of air used during biaxial stretch blow molding, together with recirculation air in the factory building and heated air of the heating zone 1, is suctioned by the suction chamber 4 provided in the heating zone 1, is filtered by the primary filter 6 and the secondary filter 7, and exchanges then heat with the primary cooling coil 8, to be adjusted to a constant temperature. Next, the air is pressure-fed by the air blower 10, passes through the low-temperature duct 12 and is discharged into the factory building via the blowout port 12a. Repeated circulation of this clean air allows air having constant temperature and cleanliness to be discharged steadily into the factory building. As a result, the temperature in the factory building can be kept constant while keeping to a minimum the introduction of outside air. After spreading within the factory building, the clean air recirculates into the heating zone 1 and the blow zone 2 via the vents 3a provided in the side faces of the housing 3. The clean air is suctioned by the suction chamber 4, is filtered again, and is discharged into the factory building while exchanging heat with the primary cooling coil 8. As a result, not only the temperature in the factory building but also the atmosphere temperatures in both the heating zone 1 and the blow zone 2 can be kept constant by repeatedly causing this clean air to circulate through the heating zone 1 and the blow zone 2. This has the effect of lowering the total running costs incurred in, for instance, temperature control in the factory building and temperature control in the heating zone 1 and the blow zone 2. Further, the air discharged out of the blowout port 12a of the low-temperature duct 12 is filtered clean air. This clean air spreads within the factory building, where it recirculates being fed continuously to the heating zone 1 and the blow zone 2. The interior of the factory building, the heating zone 1 and the blow zone 2 can be made appropriately clean as a result.

The heated air of the heating zone 1 is appropriately captured by the suction chamber 4, and is filtered/cooled, to be discharged again into the factory building. As a result, this allows preventing the work environment in the factory building from deteriorating on account of rising temperature.

Air temperature is adjusted with high precision through adjustment of the flow rate of cooling water in the primary cooling coil 8, through adjustment of the flow rate of cold water in the secondary cooling coil 9, and through adjustment of the blowing volume in the air blower 10, or by a suitable combination of these.

In another embodiment, the heating zone 1 and the blow zone 2 do not communicate via the simple partition S. Instead, a gas-tight partition wall F shuts off communication of air between the heating zone 1 and the blow zone 2, as illustrated in FIG. 3. A suction chamber 4 may be provided also for the blow zone 2, and the air suctioned out of the blow zone 2 may be merged with the air in the high-temperature duct 5 by way of a medium temperature duct 5a.

Also, a door (not shown in the figure) may be provided in the side faces of the housing 3 in lieu of the vents 3a, such that the clean air discharged into the factory building recirculates into the heating zone 1 and the blow zone 2 via such a door.

Alternatively, the low-temperature air flowing through the low-temperature duct 12 may be extracted by an extraction duct 12b and made to recirculate directly to the blow zone 2 as shown in FIG. 4.

FIG. 5 is a schematic explanatory diagram illustrating a blow molding machine with air conditioning 400 of the present invention.

The blow molding machine with air conditioning 400 comprises a heating zone 1 where a preform P is pre-heated by a heater H; a blow zone 2 where the pre-heated preform P is set in a mold M and biaxial stretch blow molding is carried out using a stretching rod R and high-pressure air; a housing 3 covering the above zones; a suction port 4-1 that suctions high-temperature air from the heating zone 1; a high-temperature duct 5 through which there flows high-temperature air flowing in from the suction port 4-1; a coarse primary filter 6 that filters the high-temperature air; a fine secondary filter 7 that filters the high-temperature air; a cooling water coil 8-1, as first cooling means, through which there flows cooling water that robs heat from the high-temperature air; a primary solenoid valve 81 that adjusts the flow rate of the cooling water; a cold water coil 9-1, as second cooling means, through which there flows cold water that recovers the heat robbed by the cooling water; a secondary solenoid valve 91 that adjusts the flow rate of the cold water; an air blower 10, as air-blowing means, that feeds low-temperature air downstream; an electric motor 11 that drives the air blower; a low-temperature duct 12 through which the low-temperature air flows; a return duct 13-1 communicating with the blow zone; a primary flow-adjusting valve 14-1 that adjusts the flow rate of low-temperature air flowing towards the blow zone; an extraction duct 15-1 communicating with the interior of the building; a secondary flow-adjusting valve 16-1 that adjusts the flow rate of the low-temperature air discharged into the building; a blowout port 17-1 through which the low-temperature air flows out; an in-side temperature sensor 18-1 that measures the temperature of the low-temperature air flowing into the blow zone; an out-side temperature sensor 19-1 that measures the temperature of high-temperature air flowing out of the heating zone; an in-side temperature monitor 20 and an out-side temperature monitor 21, which receive measurement signals from the in-side temperature sensor 18-1 and the out-side temperature sensor 19-1 and display temperature measured values, and values which the user input as set temperatures therein; a flow meter 22 that measures the flow rate flowing through the return duct 13-1; and a control device 23 as control means for controlling the primary solenoid valve 81, the secondary solenoid valve 91 and the revolutions of the electric motor 11 on the basis of the deviation between set temperatures and temperature measured values. For convenience of drawing, the cold water coil 9-1 is depicted in the drawing as opposing the high-temperature air and arranged side-by-side with the cooling water coil 8-1. In actuality, however, the cold water coil 9-1 is arranged so as to exchange heat with the cooling water coil 8-1, without opposing the high-temperature air.

The heating zone 1 and the blow zone 2 are partitioned by a simple partition S that allows inflow and outflow of a gas, such that air flows from the blow zone 2 to the heating zone 1. As described below, air flowing out of the blowout port 17-1 is clean air of which temperature and flow rate are kept constant. The atmosphere temperatures in the blow zone 2 and the heating zone 1 can be kept constant through continuous flow of that clean air. The problem in conventional blowing equipment, to the effect of changes in the measurement values of final-shape bottles caused by outside air temperature fluctuation, is therefore less likely to occur, regardless of whether heating temperature and mold temperature are controlled so as to be constant.

Moreover, the air having been filtered, temperature-adjusted and flow rate-adjusted can also contribute to maintaining positive pressure in the building by being extracted via the extraction duct 15-1 and being discharged into the building.

Air returning to the blow zone 2 from the blowout port 17-1 is kept at, for instance, 20° C., and is heated as it flows from the blow zone 2 to the heating zone 1, as a result of which the temperature of the air rises to, for instance, 50 to 55° C. in the vicinity of the suction port 4-1. The temperature-raised high-temperature air passes through the high-temperature duct 5, through the primary filter 6 and the secondary filter 7, and is cleaned to a predetermined cleanliness level.

The high-temperature air cleaned to a predetermined cleanliness level comes into contact with the cooling water coil 8-1 and gives up its heat to the cooling water coil 8-1 thereby being cooled by the cooling water coil 8-1. The air is further pressure-fed by the air blower 10, and the temperature of the air drops to about 20° C. This low-temperature air flows then through the low-temperature duct 12. Some of the low-temperature air flowing through the low-temperature duct 12 returns again to the blow zone 2 via the return duct 13-1. The remaining low-temperature air is discharged into the building via the extraction duct 15-1. The temperature of the air returned to the blow zone 2 is measured by the in-side temperature sensor 18-1. A corresponding measurement signal is sent to the in-side temperature monitor 20 and the control device 23. Upon receiving the measurement signal, the in-side temperature monitor 20 indicates a measured temperature and the control device 23 checks the deviation between the measured temperature and a set temperature. If there is a deviation, the control device 23 performs control by driving the primary solenoid valve 81 to adjust the flow rate of cooling water flowing through the cooling water coil 8-1, and increase/reduce thereby the heat transfer amount between the high-temperature air and the cooling water coil, so that the indicating value of the in-side temperature sensor 18-1 comes close to the set temperature. When the control device 23 changes the flow rate in the cooling water coil 8-1 through driving of the primary solenoid valve 81, the flow rate of cold water in the cold water coil 9-1 is increased or reduced by driving the secondary solenoid valve 91 in accordance with the driving of the primary solenoid valve 81, in order for the cold water coil 9-1 to recover the excess heat of the cooling water coil 8-1.

The flow rate of the low-temperature air returned to the blow zone 2 is adjusted through adjustment of the degree of opening of the primary flow-adjusting valve 14-1. The degree of opening may be adjusted manually on the basis of the indicating value of the flow meter 22. Alternatively, the degree of opening of the primary flow-adjusting valve 14-1 may be adjusted automatically by the control device 23, through feedback of a measurement signal from the flow meter 22 to the control device 23. The flow rate of the remaining low-temperature is adjusted similarly through adjustment of the degree of opening of the secondary flow-adjusting valve 16-1.

The atmosphere temperature in the heating zone 1 is measured by the out-side temperature sensor 19-1. A corresponding measurement signal is sent to the out-side temperature monitor 21 and the control device 23. Upon receiving the measurement signal, the out-side temperature monitor 21 indicates a measured temperature and the control device 23 checks the deviation between the measured temperature and a set temperature. When there is a deviation, the control device 23 performs control by adjusting the blowing volume of the air blower 10, for instance, by operating the inverter INV of the electric motor 11, to increase/reduce the flow rate of the low-temperature air, so that the indicating value of the out-side temperature sensor 19-1 comes close to the set temperature.

In the present embodiment, the cold water coil 9-1 does not stand opposite the high-temperature air, but exchanges heat with the cooling water coil 8-1. However, the embodiment is not limited thereto, and the cold water coil 9-1 may stand opposite the high-temperature air and exchange heat therewith. In this case, the heat of the high-temperature air can be appropriately recovered by both the cooling water coil 8-1 and the cold water coil 9-1.

In the blow molding machine with air conditioning 400, some or the entirety of clean air suctioned from the heating zone 1 and having been filtered and adjusted to constant temperature and constant flow rate is returned again to the blow zone 2 via the blowout port 17-1. The atmosphere temperatures in the blow zone 2 and the heating zone 1 can be kept constant through continuous flow from the blow zone 2 to the heating zone 1. As a result, bottles can be produced stably, with stable measured values of the final-shape bottles, even if the outside air temperature fluctuates. The air returned to the blow zone 2 becomes high-temperature air by passing through the heating zone 1, being suctioned by the suction port 4-1, exchanging heat with the cooling water coil 8-1, being further pressure-fed by the air blower 10 and becoming low-temperature air to be re-used. On the other hand, the remaining low-temperature air not being reused is discharged into the building. Both temperature and pressure can be managed as a result in the building in which the blow molding machine 400 is installed. This has the effect of lowering the total running costs incurred in, for instance, temperature control in the building and temperature control in the heating zone 1 and the blow zone 2. Also, air flowing out of the blowout port 17-1 of the blow zone 2 is filtered clean air that is continuously being supplied from the blow zone 2 to the heating zone 1. This allows as a result keeping both of the blow zone 2 and the heating zone 1 in appropriate clean condition.

The temperature of the air being returned to the blow zone 2 is adjusted with high precision through adjustment of the flow rate of the cooling water in the cooling water coil 8-1 and adjustment of the flow rate of the cold water in the cold water coil 9-1, or adjustment of the blowing volume in the air blower 10, or by a suitable combination of these.

In another embodiment, the air conditioning facility extending from the suction port 4-1 on through the blowout port 17-1 up to the control device 23 may be arranged separately and independently with respect to the heating zone 1 and the blow zone 2 so that the each of the atmosphere temperatures are kept constant respectively.

INDUSTRIAL APPLICABILITY

The blow molding machine with air conditioning of the present invention can be appropriately used in processes that are carried out inside a housing (protective cover) whose interior temperature must be accurately controlled, for instance in biaxial stretch blow molding of plastic bottles or the like.

The invention claimed is:

1. A blow molding machine with air conditioning, comprising a heating zone where a preform is heated, a blow zone where the preform is biaxially stretch-blown, and suction means which is provided in at least said heating zone and discharges out heated air from the interior of said heating zone, wherein air in said heating zone is suctioned by said suction means and filtered into clean air, the temperature of the air is adjusted to a constant temperature/temperature range, whereupon the air is discharged into a factory building in which said blow molding machine is installed, and is recirculated to said heating zone and said blow zone, to thereby keep constant respective atmosphere temperatures in said factory building and said zones.

2. The blow molding machine with air conditioning according to claim 1, having formed therein an air inlet section through which said air is introduced into said heating zone and/or said blow zone.

3. The blow molding machine with air conditioning according to claim 1 or 2, wherein said suction means is a fan, and the fan is surrounded by a chamber having a space inside.

4. The blow molding machine with air conditioning according to claim 1, comprising a return pipe that extracts part of the air discharged into said factory building and recirculates the extracted air to said heating zone and/or blow zone, wherein the recirculated air flows continuously in the direction from said blow zone to said heating zone after the temperature and the flow rate thereof are adjusted to a constant temperature/temperature range and a constant flow rate/flow rate range, respectively.

5. The blow molding machine with air conditioning according to any one of claims 1, 2 and 4, wherein air suctioned from said heating zone opposes a first cooling means having a flow rate adjustment capability, and exchanges heat with said first cooling means while being pressure-fed by an air-blowing means.

6. The blow molding machine with air conditioning according to claim 5, wherein said first cooling means exchanges heat with a second cooling means provided separately and having a flow rate adjustment capability.

7. The blow molding machine with air conditioning according to claim 5, wherein the temperature of air being recirculated to said blow zone is controlled by a control means that operates said first cooling means and a second cooling means or said air-blowing means, or a combination of these, on the basis of a feedback signal from a temperature sensor.

8. The blow molding machine with air conditioning according to claim 3, wherein air suctioned from said heating zone opposes a first cooling means having a flow rate adjustment capability, and exchanges heat with said first cooling means while being pressure-fed by an air-blowing means.

9. The blow molding machine with air conditioning according to claim 8, wherein said first cooling means exchanges heat with a second cooling means provided separately and having a flow rate adjustment capability.

10. The blow molding machine with air conditioning according to claim 6, wherein the temperature of air being recirculated to said blow zone is controlled by a control means that operates said first cooling means and said second cooling means or said air-blowing means, or a combination of these, on the basis of a feedback signal from a temperature sensor.

11. The blow molding machine with air conditioning according to claim 8, wherein the temperature of air being recirculated to said blow zone is controlled by a control means that operates said first cooling means and a second cooling means or said air-blowing means, or a combination of these, on the basis of a feedback signal from a temperature sensor.

12. The blow molding machine with air conditioning according to claim 9, wherein the temperature of air being recirculated to said blow zone is controlled by a control means that operates said first cooling means and said second cooling means or said air-blowing means, or a combination of these, on the basis of a feedback signal from a temperature sensor.

* * * * *